United States Patent [19]
Coombs

[11] 3,868,098
[45] Feb. 25, 1975

[54] SHOCK ABSORBING TRAILER HITCH
[76] Inventor: Harold B. Coombs, 510 S. Sixth St., Kenedy, Tex. 78119
[22] Filed: Oct. 2, 1973
[21] Appl. No.: 402,784

[52] U.S. Cl. .................................. 267/138, 280/487
[51] Int. Cl. .............................................. F16g 7/10
[58] Field of Search................. 267/138; 114/235 H; 280/483, 484, 486, 487, 485, 489

[56] References Cited
UNITED STATES PATENTS

| 1,565,112 | 12/1925 | Sommer | 280/487 |
| 1,884,323 | 10/1932 | Snow, Jr. | 280/487 |
| 2,121,416 | 6/1938 | White | 280/487 |
| 3,140,881 | 7/1964 | Antici | 280/487 |

Primary Examiner—James B. Marbert
Attorney, Agent, or Firm—Donald R. Comuzzi; Ted D. Lee

[57] ABSTRACT

A shock absorbing trailer hitch is disclosed. The hitch includes a housing having a reciprocable tongue extending centrally through the casing adapted for mounting to a pick-up truck or similar vehicle. A cross member is secured to the tongue intermediate the casing and oppositely arranged pairs of dampening springs are engaged by the cross member to cushion shock loading encountered at the tongue. A removable cover plate facilitates access to the spring components.

8 Claims, 3 Drawing Figures

SHOCK ABSORBING TRAILER HITCH

The present invention relates to a trailer hitch and more particularly, the present invention relates to a trailer hitch for cushioning the operative connection between a towed vehicle and a towing vehicle.

It is well known in the art to provide shock absorbing apparatus associated with a trailer draw bar. The construction of such shock absorbing apparatus generally utilizes a cylindrical housing supporting an axially movable shaft member which carries a piston-like block member. A pair of helical cushion springs are disposed about the shaft on opposite sides of the block; the springs being operately engaged by the block as the shaft is reciprocated due to loads sustained during towing. Some hitches of this general type include multiple sets of springs which are sequentially engaged so that relief springs are automatically engaged for cushioning abnormally heavy shocks encountered during towing. Typical of shock absorbing trailer hitches of this general type is the hitch shown in U.S. Pat. No. 2,783.039.

While the shock absorbing trailer hitches of the general type described above are generally effective for accomodating accomodating loads encountered when towing, certain disadvantages are attendant to their design and use. The conventional trailer hitch shock of this type usually contains the springs within a sealed housing. Should a shock absorbing spring fail, it becomes difficult or even impossible to repair the shock absorbing unit and the entire unit must be replaced. Further the design of the unit requires that the unit be sized for specific shock absorbing capacities or loading. Due to the design of these units, it is not practical to make the unit adaptable to various loading conditions by altering the size of the load resisting springs. The units of the aforementioned type are generally quite bulky to accomodate a sufficiently large spring to resist the loadings encountered in towing. These units are not easily affixed to conventional towing units and often require the use of special structural supporting members to secure the unit to a towing vehicle. Further, when mounted to a towing vehicle such as a truck, the prior art shock absorbing hitches often project from the rear of the truck presenting a substantial hazard.

The present invention provides a shock absorbing trailer hitch which is particularly suited for its intended purposes. The shock absorbing hitch of the present invention is particularly compact and adaptable for attachment for most standard towing vehicles. The unit is internally accessable so that repairs or modifications can easily be made. Should the user wish to change the load resisting springs to accomodate different load requirements, such an adaptation can easily be accomplished. The shock absorbing unit of the present invention, provides a trailer hitch shock absorbing mechanism capable of satisfactorily dampening oscillation induced by both light and heavy loads, protecting both the towed and the towing vehicle. In addition to the dampening of loads to reduce wear and tear on the vehicles, a safer, more stable ride also results.

In accordance with the present invention, the trailer hitch includes a housing having flanges adapted for attaching the housing to a surface on the towing vehicle. A removable cover encloses the housing. A generally flat tongue axially extends through the housing having a trailer engaging rear portion. A cross member is carried on the tongue within the housing and is engaged by two pairs of load springs which oppositely extend at the sides of the tongue to the housing end walls. The reciprocation of the tongue induced during transit of the vehicle and trailer is resisted by the springs and attendant shock loads are cushioned.

A more complete understanding of the present invention will had from the following specifications, claims and drawings in which:

Figure 1:
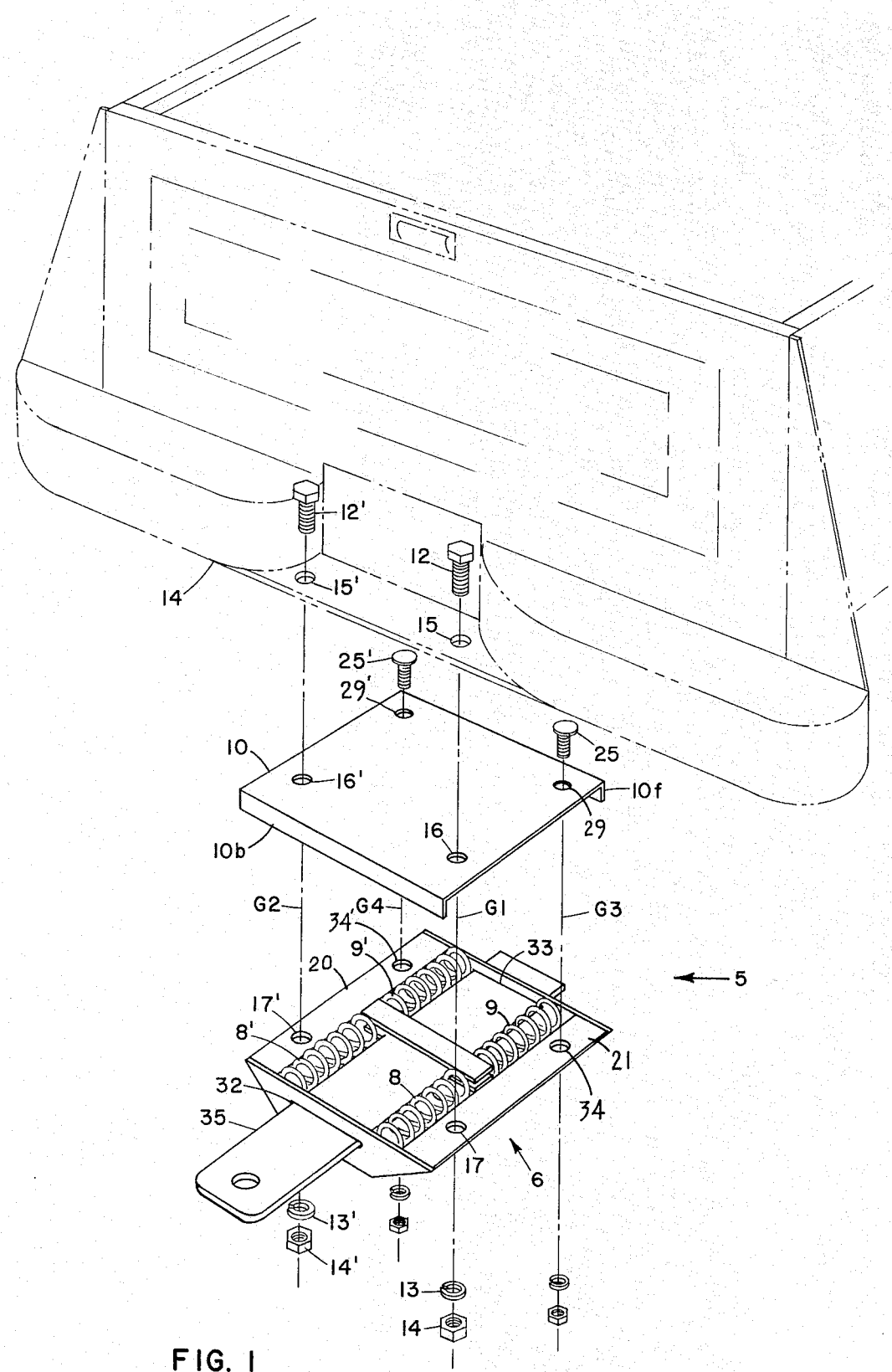
FIG. 1 is an exploded perspective view of the trailer hitch of the present invention, shown in conjunction with the rear end of a typical pick-up truck type towing vehicle.
Figure 2:
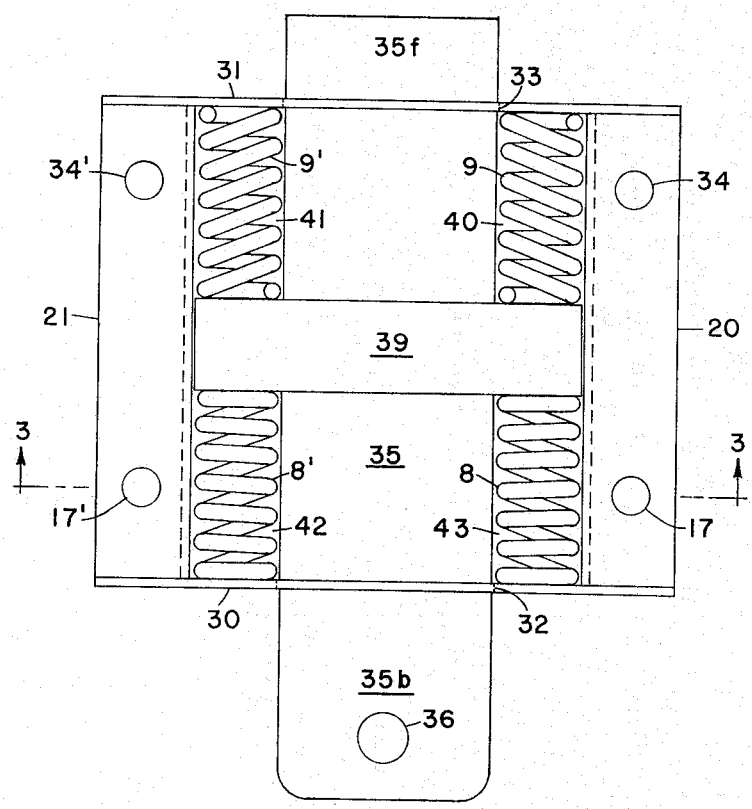
FIG. 2 is a plan view of the trailer hitch of the present invention with the cover plate removed to more clearly illustrate the internal structure.
Figure 3:
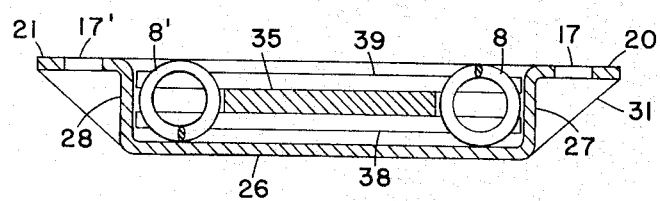
FIG. 3 is a hoizontal section view taken along lines 3—3 of FIG. 2.

Referring now to the drawings, the trailer hitch of the present invention in generally designated by the numeral 5 and includes a lower housing member 6 enclosed by a cover plate 10. The lower housing member 6 includes a generally flat bottom 26 having upstanding opposite side walls 27 and 28 and forward end plate 31 and rear end plate 30, which together define a generally rectangular cavity or chamber 15. The relative terms "forward" and "rear" are with reference to the orientation of the unit when attached to a towing vehicle such as the pick-up truck shown in FIG. 1. Opposite horizontal flanges 20 and 21 extend respectively from the upper edges of sidewalls 27 and 28, respectively, and are coextensive with the length of the side walls. Assembly holes 17 and 17' are provided in flanges 20 and 21 adjacent the rear end of the unit. Assembly holes 34 and 34' are provided in flanges 20 and 21 adjacent the forward edge of the unit. Axially aligned transverse slots 32 and 33 are provided in the opposite end walls 30 and 31 of the housing member 6.

The cushioning mechanism includes an elongated flat tongue 35, reciprocal in slots 32 and 33 having a rearwardly projecting portion 35f and a forwardly projecting portion 35b. Tongue section 35b is adapted for attachment to the drawbar of the towed vehicle as for example by means of hole 36. Hole 36 could be secured to a conventional ball-type hitch or could be connected to the towed vehicle at a bifurcated coupling and secured by a retaining pin.

A cross-member consisting of upper flat bar 39 and lower flat bar 38 are secured respectively to the upper and lower sides of tongue 35 at a location intermediate end walls 30 and 31 of the housing. Bars 38 and 39 are affixed to tongue 35 as by welding and are an integral part of the tongue. It will be seen that the tongue 35 and the cross members 38 and 39 separate the housing chamber 15 into four longitudinal compartments which contain the dampening springs. Rear springs 8 and 8' are provided on opposite sides of the tongue 35 extending between the rear end wall 30 and the cross members 38 and 39. The forward shock absorbing springs 9 and 9' extend between the cross members 38 and 39 and the forward end wall 31 of the housing. The unit is enclosed by a generally flat coverplate 10 having forward and rear depending lips or flanges 10b and 10f which overlap the upper marginal portions of the forward and rear end walls respectively. Holes 16 and 16' in the coverplate 10 are adapted to align with holes 17 and 17' in the flanges 20 and 21. Similarly, holes 29 and 29' are arranged to align with holes 34 and 34' and flanges 20 and 21. The unit is secured by bolts 25 and 25' extending through the aligned holes and the coverplate 10 and the flanges 20 and 21. Preferably bolts 25 and 25' are of the flat-head type so as to prevent interference with the mounting surface as will be explained in greater detail hereafter. Bolts 12 and 12' and associated lock washers 13 and 13' and nuts 14 and 14' secure the rear edge of coverplate 10 to the lower housing member 6.

Preferably the springs 8, 8', 9 and 9' are helical coil springs that are selected in accordance with the design load requirements for the particular cushioning unit. Initially, the springs are compressed slightly when installed with the tongue in the neutral position. Typically, each of the springs will be compressed in the order of ½ inch and for a typical load rating will have a spring rate yielding about 300 pound load resistance in ½ inch of compression. It will be seen that the operation of the unit is axially bidirectional so that when the tongue moves in one direction, as for example rearwardly, the rear springs 8 and 8' are placed in compression and the forward springs 9 and 9' are placed in tension. When the tongue 35 is caused to move forwardly under load, springs 9 and 9' are compressed and, correspondingly, rear springs 8 and 8' are placed in tension.

A more complete understanding of the present invention will become apparent from the following description of the method of installation and use of the cushioning device of the present invention. Referring particularly to FIG. 1, the device 5 can be installed on a flat surface at the rear portion of various types of towing vehicles. A rear bumper 14 of a pick-up truck is shown as being typical. Holes 15 and 15' are drilled in the center of bumper 14 spaced apart to align with holes 16 and 16' of the coverplate. Hexagonal bolts 12 and 12' extend through the bumper 14, coverplate 10 and flanges 20 and 21 of the unit and are secured by appropriate lock washers 13 and 13' and nuts 14 and 14'. The flat heads of bolts 25 and 25' are substantially flush and will not interfer with the mounting of the unit to the underside of the bumper. Once the bolts 12 and 12' are securely in place, the unit is ready for use.

Tongue portion 35b is secured at hole 36 to a suitable trailer hitch such as a bifurcated coupling having registering apetures which are adapted receive a suitable locking pin. With the trailer and the towing vehicle connected as described above, the hitch is in full operative position and the towed vehicle will follow along behind the towing vehicle. Shocks encountered either by the towed or towing vehicle during transit will be dampened at the cushioning device 5 and will not be transmitted from one vehicle to another. This results in a smoother ride and a safer ride particularly, since shocks encountered by the trailer will not be transferred to the towing vehicle to cause the towing vehicle to become unstable and unsafe.

Should the user wish to increase or decrease the stiffness of the load resisting springs, the unit can easily be disassembled by removing the appropriate nuts and bolts 25, 25', 12 and 12' freeing the lower housing members 6 from the coverplate. The appropriate springs 8 and 8', 9 and 9' can be replaced with springs of the required stiffness. Similarly, repairs in case of spring breakage or damage can be made in the same manner.

Thus, it will be seen from the foregoing that the present invention provides a unique cushioned hitch that is easily adaptable to use with a varity of towing vehicles.

The device is effective and adapted for easy repair and replacement of the internal springs to allow the user to change the dampening characteristics of the cushioning devise. In addition, the present invention facilitates simple and economical manufacture.

Although the invention has been described in some detail by way of illustration and example for purposes of clarity and understanding, it is understood it is not to be so limited since changes, alterations, modifications may be obvious to those skilled in the art and such changes, alterations, modifications are intended to be within the scope of this invention as hereafter claimed.

What is claimed is:

1. A trailer hitch comprising:
   a substantially closed housing consisting of a closed bottom wall and opposite side walls having opposite end walls, said end walls having aligned openings therein;
   a tongue axially extending through said aligned openings and reciprocable therein;
   a cross member secured to said tongue intermediate said end walls;
   resilient means extending axially between said cross member and said end walls whereby loads imposed at said tongue are dampened; and said housing having a closed cover plate removably secured thereto.

2. A trailer hitch comprising:
   a substantially closed housing consisting of a closed bottom wall and opposite side walls and having opposite front and rear end walls, said end walls having aligned openings therein;
   a flat tongue extending through said aligned openings having a front and rear portion projecting beyond said housing and reciprocable therein;
   means associated with said housing adapted to secure said housing to a towing vehicle;
   a cross member secured to said tongue intermediate said end walls and defining with said housing and tongue first and second spaces extending forwardly from said cross member at opposite sides of said tongue to said front end wall and third and fourth spaces extending rearwardly from said cross member at opposite sides of said tongue to said rear end wall;
   resilient means occupying said first, second, third and fourth spaces whereby loads reciprocating said tongue are dampened by said resilient means; and said housing having a closed cover plate removably secured thereto.

3. The trailer hitch of claim 2 wherein said resilient means comprise helical coil springs.

4. The trailer hitch of claim 2 wherein said tongue carries means adapted for connecting said tongue to a trailer.

5. The trailer hitch of claim 4 wherein said means adapted for connecting said tongue to a trailer comprises a hole.

6. A trailer hitch comprising:
   a housing having a closed bottom wall and closed opposite side walls and opposite front and rear end walls defining a dampening chamber, said opposite end walls having aligned slots therein;
   a flat tongue extending through said slots having a rear portion extending rearwardly of said rear wall and a front portion extending forwardly of said front end wall;

generally horizontal flange means extending from said housing side walls;

a cross member secured to said tongue intermediate said end walls, said cross member projecting laterally beyond the sides of said tongue;

a first resilient member extending between said cross member and said front end wall at one side of said tongue;

a second resilient member extending between said cross member and said front end wall at the other side of said tongue;

a third resilient member extending between said cross member and said rear end wall at one side of siad tongue;

a fourth resilient member extending between said cross member and said rear end wall at the other side of said tongue, whereby loads imposed by said trailer are transferred to said resilient members and dampened thereby; and closed cover means adapted to enclosed said housing, said cover and said flanges having registering apetures adapted to receive removable fastener mean whereby convenient access to said resilient mean is provided.

7. The hitch of claim 6 wherein said cover includes lip means projecting from said cover means and adapted to overlap said rear end wall.

8. The hitch of claim 6 wherein said apetures are adapted to mount said housing to a towing vehicle.

* * * * *